United States Patent [19]

Togashi

[11] Patent Number: 4,642,619
[45] Date of Patent: Feb. 10, 1987

[54] NON-LIGHT-EMITTING LIQUID CRYSTAL COLOR DISPLAY DEVICE

[75] Inventor: Seigo Togashi, Tokorozawa, Japan

[73] Assignee: Citizen Watch Co., Ltd., Tokyo, Japan

[21] Appl. No.: 561,350

[22] Filed: Dec. 14, 1983

[30] Foreign Application Priority Data

Dec. 15, 1982 [JP] Japan ............................. 57-219709

[51] Int. Cl.$^4$ ............................................. G09G 3/36
[52] U.S. Cl. .................................. 340/701; 340/703; 340/784; 358/59
[58] Field of Search ............... 340/701, 703, 784, 793, 340/702; 358/59, 77, 64, 53

[56] References Cited

U.S. PATENT DOCUMENTS

| | | | |
|---|---|---|---|
| 3,295,228 | 1/1967 | Turnbull | 340/701 |
| 4,481,530 | 11/1984 | Wagensonner et al. | 340/702 |
| 4,491,863 | 1/1985 | Kurahashi | 358/64 |

FOREIGN PATENT DOCUMENTS 54-122996  9/1979  Japan ............................. 340/702

Primary Examiner—Gerald L. Brigance
Attorney, Agent, or Firm—Birch, Stewart, Kolasch & Birch

[57] ABSTRACT

A color display device of the type having a plurality of light-transmissible and non-light-emitting picture elements such as liquid crystal display. The plurality of non-light-emitting picture elements for red, green and blue are arranged in checked arrangement. The number of the picture elements for green is larger than each of the other picture elements for red and blue and the total intensity of transmitting light at each of picture elements for said three colors is equal to each of the other picture elements, respectively. The number of picture elements for green is, for example, twice as many as either one of the other picture elements.

4 Claims, 13 Drawing Figures

NON-LIGHT-EMITTING LIQUID CRYSTAL COLOR DISPLAY DEVICE

BACKGROUND OF THE INVENTION

The present invention relates to a color display device, and more particularly to an improvement of the color display device of a non-light-emitting type typically comprising a combination of a matrix liquid crystal display and a filter of three primary colors.

The non-light-emitting type display such as a liquid crystal display or an electrochromic display (EC) has advantages in that the displayed pattern can be seen in strong light better than a light-emitting type display such as a cathode-ray tube (CRT), as well as having low power consumption and a smaller capacity. In recent years, studies of color display devices with the non-light-emitting displays have been extensively made, and various methods have been proposed. A color display employed with a filter is disclosed in U.S. Pat. No. 3,840,695. In this method, filters of three primary colors comprising red, green and blue are disposed on corresponding display elements (picture elements). The light transmitting filter is colored depending on the color of the filter. If the pitch between color elements of three primary colors is sufficiently small, it is possible to produce a desirable color by mixing the colors.

However, in the conventional display, picture elements of three primary colors are almost equal in area and number. Therefore, in order to establish a color display having the same resolution as a monochrome display, it is necessary to increase the number of picture elements by three times as many as that of the monochrome display. The increase of the number of picture elements causes complications in the manufacturing process, driving electrodes and circuit, which results in increase of cost and size of the device.

SUMMARY OF THE INVENTION

An object of the present invention is to provide a color display device which may improve resolution and decrease the number of picture elements while maintaining excellent color reproduction characteristics.

According to the present invention, there is provided a color display device of the type having a plurality of non-light-emitting picture elements for red, green and blue and means for selectively driving each element in dependence on picture signals, wherein the improvement comprises a larger number of picture elements for green being than each of the other picture elements for red and blue, the total intensity of transmitting light of each of the picture elements for said three colors being substantially equal to each of the other picture elements, respectively.

These and other objects and features of the present invention will become more apparent from the following description with reference to the accompanying drawings.

BRIEF DESCRIPTION OF THE DRAWINGS

FIGS. 3a to 3e are front views of arrangements of picture elements according to the present invention;

DESCRIPTION OF THE PREFERRED EMBODIMENTS

Figure 1:
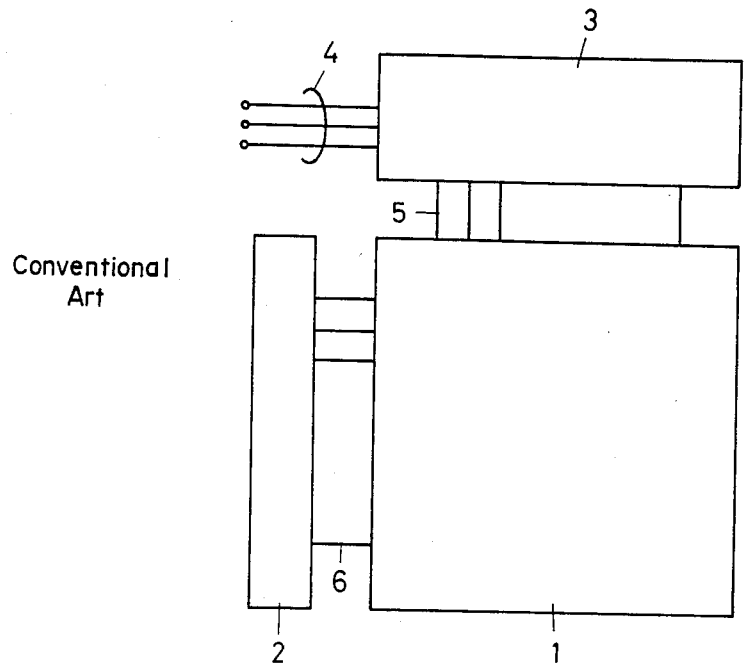
FIG. 1 is a block diagram of a conventional color display system.
Figure 2:
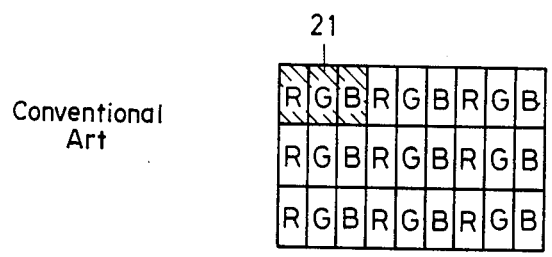
FIG. 2 is a front view of an arrangement of picture elements in the conventional color display device of FIG. 1.

Referring to FIG. 1, a conventional color display system comprises a display panel 1 in which display material such as liquid crystal material is disposed between row electrodes 6 and column electrodes 5 to form a plurality of display elements in checked arrangement, a row driving circuit 2 and a column driving circuit 3. The column driving circuit is operated in dependency on picture signals 4 (R, G, B) and the row driving circuit 2 is operated in synchronism with the picture signals for selectively driving display elements in the display panel. The display panel 1 is provided with filters of the three primary colors as shown in FIG. 2 in which one section corresponds to one display element. Three sections comprising three primary colors of red R, green G, and blue B form one group 21.

In the display, it is necessary to have a high resolution by a small number of picture elements. The conventional arrangement of picture elements of FIG. 2, in which the picture elements are the same in area and number, does not have high resolution characteristics as explained hereinafter. Green is the highest in spectral luminous efficacy. Therefore, the information from green largely affects on resolution. Since the area and number of green elements of FIG. 2 are the same as red and blue, the display is not satisfactory in resolution.

If a larger number of green picture elements than the number of red and blue picture elements are disposed, a higher resolution can be obtained. However, as to a non-light-emitting type display, the illuminance of the display is fixed, which is decided by ambient brightness. Accordingly, if the number of green picture elements increase without changing the intensity of transmitting light at the green picture elements in order to heighten the resolution, white cannot be produced because of an increase of intensity in transmission light at the green picture elements. The present invention solves such a problem by providing a greater number of green picture elements, each having smaller area than each of the other picture elements without increasing the total area of green picture elements, or by providing a greater number of green picture elements each of which is the same as the other picture element in area but the filter for green having a smaller transmission coefficient than the other filters.

Figures 3A, 3B, 3C, 3D, 3E:
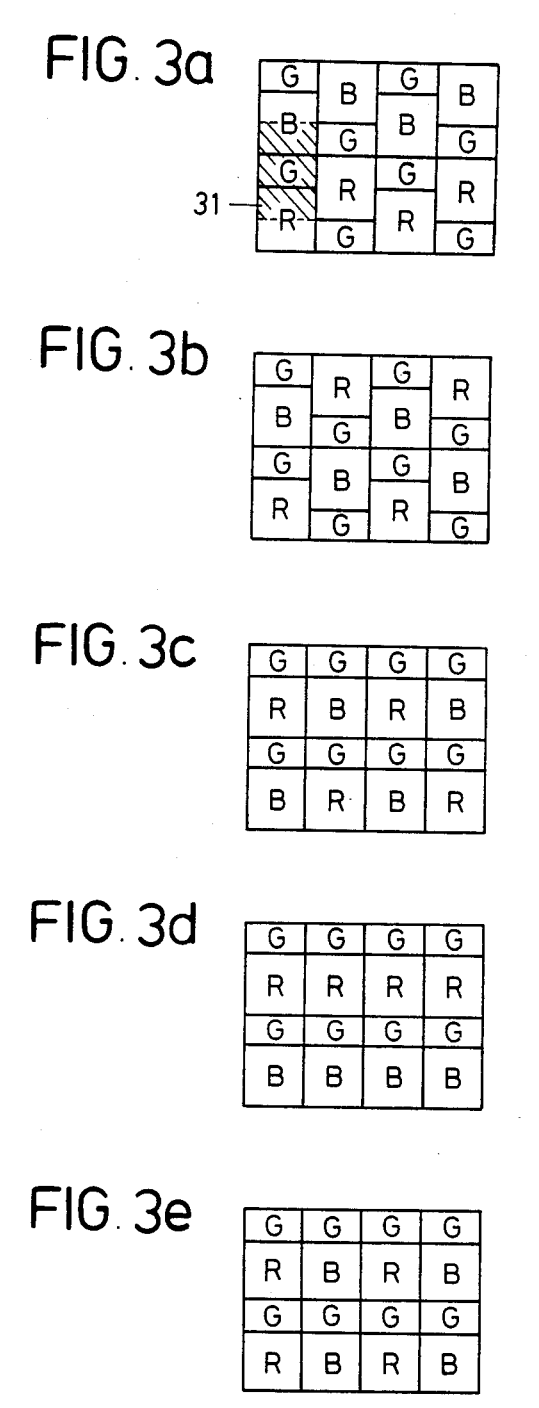

FIGS. 3a to 3e show arrangements of three primary colors according to the present invention, in which the total area of the each of picture elements is equal to each of the other picture elements. Referring to FIG. 3a, green picture elements G are disposed on every other column such as G.G.G in each row. As shown by reference 31, at upper and lower sides of picture element G, red picture element R and blue picture element B are disposed. Each area of picture elements R and B is twice as much as picture element G. That is, picture elements are substantially equal in total area.

Since the number of green picture elements is larger than the number of red or blue picture elements and red and blue picture elements are disposed on the upper and lower side of each green picture element, satisfactory color resolution can be obtained.

FIG. 3b shows another arrangement of picture elements. In the pattern, red and blue elements are so disposed that the same colors are not adjacent to each other. Therefore, an arrangement of the three primary colors is more complicated so as to provide sufficient color mixing.

Referring to FIGS. 3c to 3e, picture elements G are arranged straight in the row direction. Particularly in FIG. 3d, three picture elements R, G and B are sequentially aligned in a column direction so that the arrangement is formed by uniform stripes of three picture elements.

The arrangement corresponding to that which each pattern of FIGS. 3a to 3e is rotated to the right is the same as each arrangement of FIGS. 3a to 3e in characteristics.

Figure 4:
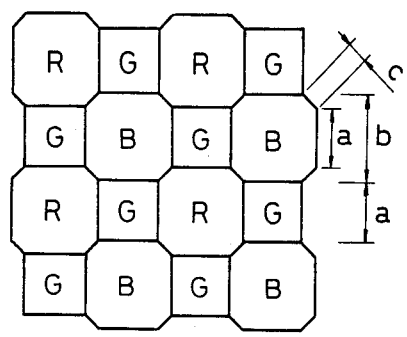
FIG. 4 is a front view of another arrangement of picture elements of the present invention.

FIG. 4 shows another example of picture element arrangement of the present invention. Green elements G are disposed in checkered arrangement and red elements R and blue elements B are disposed therebetween and the number of green elements is twice as many as each of the other respective picture element colors. In order to equalize the total area of each picture element with each other, green element G is in the shape of a small square and each of red and blue elements R and B is in the shape of large octagon. If the octagon is made in such a shape that the length of the longer side is almost the same as the length a of the side of the square green element, the length of the shorter side c is about $(\sqrt{3}-\sqrt{2})a$, the length b is about $(\sqrt{6}-1)a$, the area of green picture element becomes nearly equal to half the area of the other picture element R or B. Thus, the total area of green picture elements becomes nearly equal to half of the sum of total areas of red and blue picture elements. By changing the order of R and B, various modifications as shown in FIGS. 3a to 3e can be provided.

In order to realize a liquid crystal display for arrangements of picture elements as shown in FIGS. 3a to 3e and 4, arrangements of electrodes will be described hereinafter.

A high density display of liquid crystal is mainly divided into a passive matrix and an active matrix as is well known. That is the active matrix disclosed in U.S. Pat. Nos. 3,840,695 and 4,233,608 which use thin film transistors or a nonlinear resistive element as an active element and the passive matrix which does not use an active element are known. For the passive matrix having a large number of picture elements, multi-matrix in which electrode arrangement is improved is employed as described in the report by Kaneko et al in "Proceedings of the SID" Vol. 23/1 (1982) Page 3–8.

Figure 5:
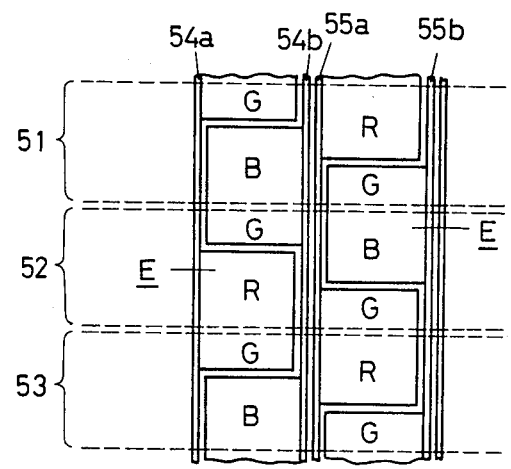
FIGS. 5 and 6 are front views of arrangements of column and row electrodes for electrodes corresponding to picture elements.

FIG. 5 shows an example for realizing the pattern of electrodes with a double-matrix comprising double-column electrodes and row electrodes of the passive matrix. The electrode pattern corresponds to the pattern of FIG. 3b. Each of row electrodes 51, 52, 53 has a width nearly equal to the length of one pitch in the column direction which is the sum of the length of a small section G for green element in one piece of electrode E and the length of a large section R or B for a red or blue element. The row electrode is so disposed as to correspond to the small section G and large section R or B at every column.

A pair of column electrodes 54a and 54b, 55a and 55b are provided on both sides of each electrode E for picture elements. Column electrode 54a is integrated with electrodes for G and R and electrode 54b is integrated with electrodes for G and B. Between row electrodes and electrodes E with column electrodes, liquid crystal material is provided. Thus, by selecting row electrodes and column electrodes, selected electrodes E for picture elements can be energized.

Figure 6:
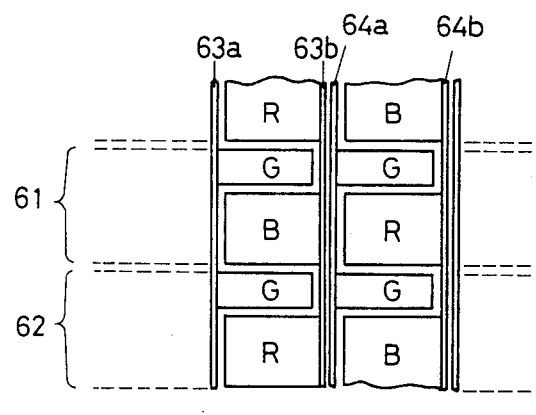

FIG. 6 shows another example for the pattern of FIG. 3c. Row electrodes 61 and 62 are the same as row electrodes of FIG. 5 in construction. A pair of column electrodes 63a and 63b, 64a and 64b are disposed on both sides of each column. The column electrodes 63a and 64a are integral with the small electrodes for G and row electrodes 63b and 64b are integrated with the large electrodes for R and B.

The electrode pattern corresponding to the pattern of FIG. 4 is suitable for the active matrix employed with an Si substrate or a thin film transistor. As to the active matrix, since the form of each picture element is defined in an electrode pattern of only one of the substrates, the pattern can be easily provided. The pattern of FIG. 4 has excellent color mixture characteristics, since the display effect little deflects compared with patterns of FIGS. 3a to 3e.

Figure 7:
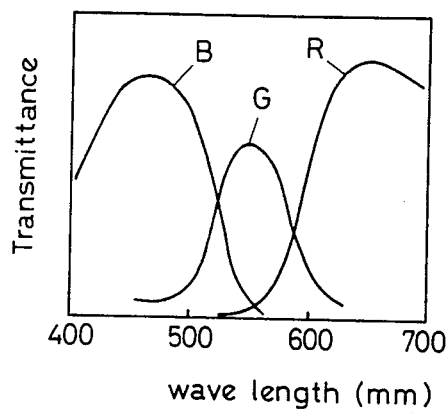
FIG. 7 is a graph showing a relationship between wave length and transmittance of filters used in another embodiment of the present invention.
Figure 8:
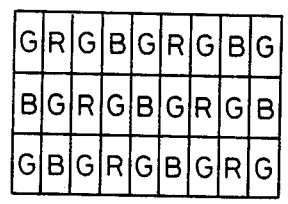
FIG. 8 is a front view of the arrangement of picture elements in the embodiment.
Figure 9:
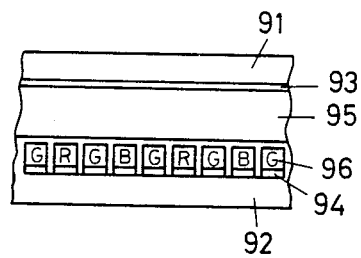
FIG. 9 is a sectional view of the embodiment.

Explaining another embodiment shown in FIGS. 7 to 9, the number of green picture elements is equal to that of each of red and blue picture elements by decreasing the transmission coefficient of the filter for green. As shown in FIG. 7, the transmittance of the green filter is lower than blue and red filters. The embodiment employs such a green filter having a small transmission coefficient.

FIG. 8 shows an arrangement of filters (picture elements) in which the number of green filters is twice as many as each of red and blue filters, but the area of green filters is equal to each of the other filters. Accordingly, the total area of the green filter is twice as much as each of the other filters.

FIG. 9 shows a section of the display device. Between substrates 91 and 92, an electrode 93, electrodes 94, filters 96 and liquid crystal material 95 are provided. The electrodes 94 are disposed to correspond to filters 96. In the device, although the number of green filters is larger than each of the other filters, the product of the total quantity of transmission light and the total area of each picture element is selected to be substantially equal to each other. Thus, the total quantity of transmission light at each picture element is equal to the other, so that the resolution and color reproduction characteristics can be greatly improved.

In accordance with the present invention, since a large number of green picture elements are equally arranged, high resolution can be obtained.

In the illustrated embodiments, although the number of red picture elements is equal to that of blue picture elements, the number of red picture elements may be decreased, since red is less effective on the resolution than blue. The total area of each color element is fixed thereby to realize a high fidelity color reproduction without changing color tone. Thus, a portable plane display device by liquid crystal can be provided.

What is claimed is:

1. In a color display device of the type having a plurality of light-transmissible picture elements for red, green and blue and means for selectively driving each element according to picture signals, wherein the improvement comprises:
   the number of picture elements for green on the entire display being larger than each of the other picture elements for red and blue on the entire display,
   the total intensity of transmitting light in the green picture elements being equal to each of the other picture elements,
   the surface of each picture element for green being square and the surface of each of the other picture elements being octagonal, and
   the picture elements for green being disposed in a checkered arrangement interposing the other picture elements.

2. The color display device according to claim 1, wherein the total number of picture elements for green is twice that of either one of the other total picture element colors, wherein the total area of the picture elements for green being approximately one-half the sum total of the areas of red and blue picture elements.

3. The color display device according to claim 1, wherein said picture elements are filters for red, green, and blue.

4. The color display device according to claim 3, wherein the transmission coefficient of the filter for green is lower than the filters for either red or blue.

* * * * *